US005819417A

United States Patent [19]

Negus

[11] Patent Number: 5,819,417

[45] Date of Patent: Oct. 13, 1998

[54] HOSE CLAMP CUTTING DEVICE

[75] Inventor: Joel A. Negus, Clarinda, Iowa

[73] Assignee: Lisle Corporation, Clarinda, Iowa

[21] Appl. No.: 946,287

[22] Filed: Oct. 7, 1997

Related U.S. Application Data

[63] Continuation of Ser. No. 482,892, Jun. 7, 1995, abandoned.

[51] Int. Cl.[6] .......... B23D 21/06; B26B 27/00

[52] U.S. Cl. .......... 30/272.1; 30/92.5; 30/356; 30/241; 30/115

[58] Field of Search .......... 30/272.1, 92, 314, 30/315, DIG. 3, 92.5, 356, 349, 351, 357, DIG. 4, 90.4, 90.3, 91.2, 277, 241, 115, 182; 81/9.3; 7/132

[56] References Cited

U.S. PATENT DOCUMENTS

| | | | |
|---|---|---|---|
| 507,792 | 10/1893 | Denham | 30/241 X |
| 1,866,095 | 7/1932 | Foley | 30/90.8 X |
| 2,338,648 | 1/1944 | Kuhl | 30/277 |
| 3,102,444 | 9/1963 | Basile | 30/182 X |
| 3,254,408 | 6/1966 | Hite | 30/277 X |
| 3,835,860 | 9/1974 | Garretson | 30/241 X |
| 4,050,154 | 9/1977 | Oetiker | 30/363 |
| 4,091,483 | 5/1978 | Lewis | 7/132 |
| 5,026,375 | 6/1991 | Linovitz et al. | 30/349 X |
| 5,046,250 | 9/1991 | Huang | 30/92 |
| 5,070,616 | 12/1991 | Chen | 30/92 |
| 5,218,765 | 6/1993 | Huang | 30/92 |
| 5,507,206 | 4/1996 | Solski | 81/9.3 |

FOREIGN PATENT DOCUMENTS

| | | | |
|---|---|---|---|
| 550463 | 1/1943 | United Kingdom | 30/272.1 |
| 2253805 | 9/1992 | United Kingdom | 30/272.1 |

*Primary Examiner*—Rinaldi I. Rada
*Assistant Examiner*—Boyer Ashley
*Attorney, Agent, or Firm*—Banner & Witcoff Ltd.

[57] ABSTRACT

A tool for cutting elastomeric type hose clamps that are applied by shrink wrapping techniques includes a tubular member with a telescoping rod therein. A blade is attached to the rod. As the handle grips, attached to the rod and the tube, are manually manipulated, the cutter blade which is positioned against the hose clamp effects a clean, quick and precise cut therethrough.

7 Claims, 4 Drawing Sheets

HOSE CLAMP CUTTING DEVICE

This is a continuation of application Ser. No. 08/482,892, filed Jun. 7, 1995 now abandoned.

BACKGROUND OF THE INVENTION

This invention relates to a device and method for cutting and removing a hose clamp from a hose, and, in particular, a hose clamp made from a shrink wrap material which is utilized to retain a hose in position on an inlet or outlet tube or fitting.

The use of hose clamps, for example, with hoses associated with an automobile engine, to retain a hose, such as a radiator hose, on a radiator inlet or outlet fitting is well known. Typically, such hose clamps are fabricated as a metal band or strap which is positioned around the hose and mechanically coupled and tightened, for example, by a screwdriver or some other fastening tool.

Recently, a new type of hose clamp has been developed. The new clamp has a closed loop or tubular configuration with opposed or opposite side edges. The circular clamp is placed over the end of the tube which is to be held in position. The hose and clamp are then placed on the inlet or outlet fitting, and the clamp is subjected to heat. The hose clamp then effectively shrink wraps itself about the hose thereby retaining the hose tightly upon the fitting.

To remove the hose clamp requires cutting the band that forms the clamp. This can be done with a razor blade or knife, for example. However, positioning the razor blade or knife in an appropriate manner and achieving the appropriate cutting action is often quite difficult and may require some manual contortion. The main reason for not using a razor blade or knife to remove the band is the risk of cutting the hose and ruining it. Cutting through the tough band with a knife without cutting into the soft hose is extremely difficult. Often the hose is removed from a component because the component is defective but the hose is still good and can be reused provided its removal from a fitting does not result in destruction or damage to the hose. Thus, a need for an improved tool and method for cutting or removing a shrink wrap type, hose clamp has developed.

SUMMARY OF THE INVENTION

In the principal aspect, the present invention comprises a device and a method for removing shrink wrapped type, hose clamps from a hose. The device comprises a hollow tube with an axial slot in the tube. A rod is telescopically positioned in the tube. A cutter bar or blade fits within the slot and is attached to the rod. A spring or biasing member biases the rod in a manner which positions the cutter bar at one end of the slot opposite a tab at the opposite end of the slot. To effect a cutting operation, the web or band of the hose clamp is fitted between the tab and the cutter bar. Handle grips associated respectively with the tube and rod are engaged and moved toward one another against the biasing force of the spring as well as the resistance associated with the hose clamp. In this manner the cutter bar cuts through the hose clamp without cutting into the hose. The reason the cutter does not cut into the hose is because a foot is machined into the end of the cutter. This foot is very smooth and dull and is positioned to slide between the hose and the band thereby simultaneously holding the cutter in cutting position and protecting the hose.

Thus, it is an object of the invention to provide an improved hose clamp cutting device.

It is a further object of the invention to provide a method for cutting and removing a hose clamp from a hose on a fitting associated with the hose wherein the method does not require unwieldy movement and positioning of a cutting member.

Yet a further object of the invention is to provide a hose clamp cutting device which is mechanically easy to utilize, which has a low cost to manufacture, which is rugged and which is simple to operate.

These and other objects, advantages and features will be set forth in the detailed description which follows.

BRIEF DESCRIPTION OF THE DRAWING

In the detailed description which follows referenced will be made to the drawing comprised of the following Figures.

DETAILED DESCRIPTION OF THE PREFERRED EMBODIMENT

Figures 1, 4:
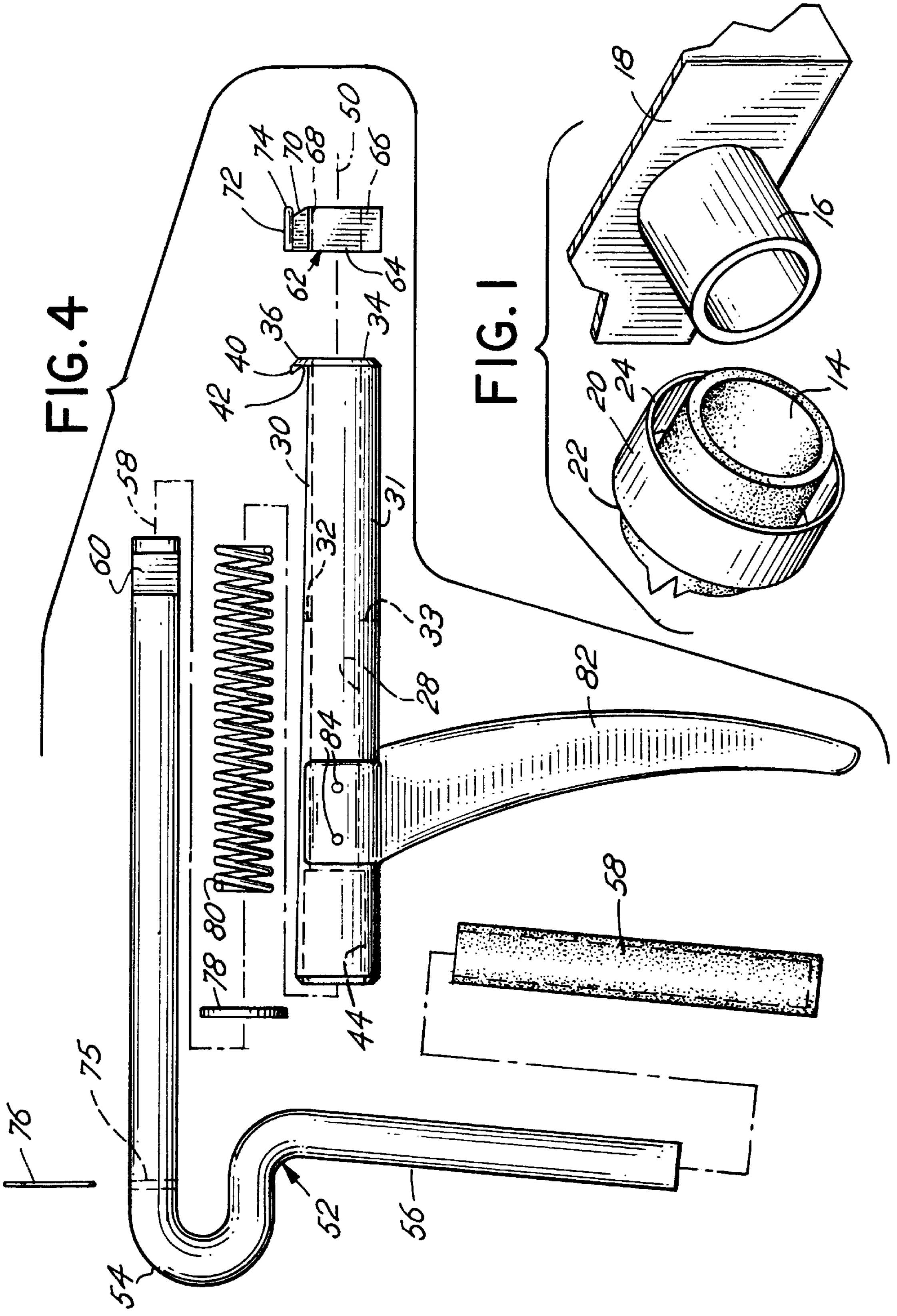
FIG. 1 is an exploded, isometric view of a typical radiator hose ready for attachment to a radiator inlet or outlet in combination with a "shrink wrap" type hose clamp or band.
FIG. 4 is an exploded side elevation of the hose clamp cutter tool of the invention.
Figure 2:
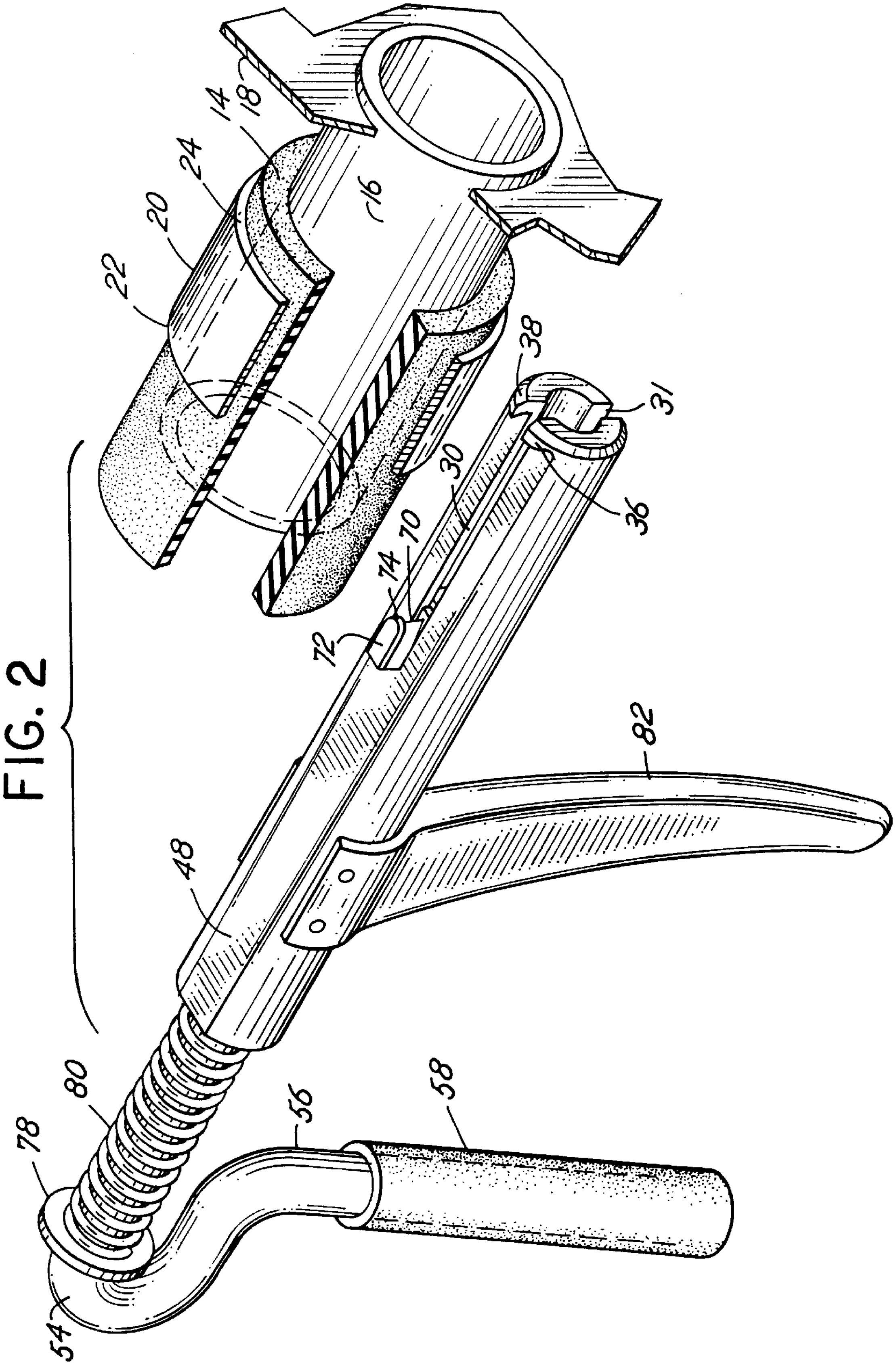
FIG. 2 is a isometric of an assembled radiator hose on a radiator inlet or outlet having a band positioned to retain the radiator hose thereon and further illustrating the improved hose clamp cutter of the present invention ready for engagement with the hose clamp or hose band.
Figure 3:
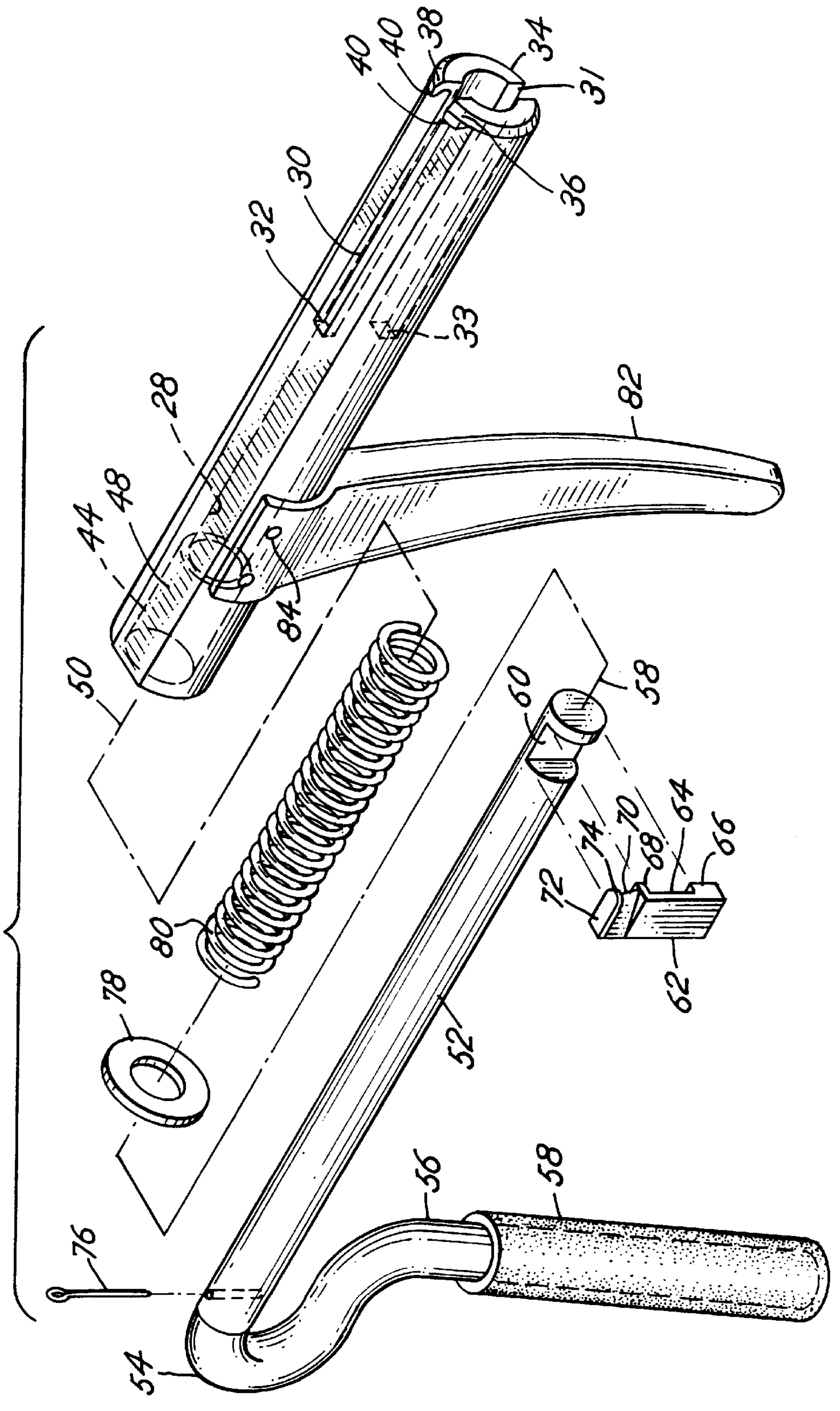
FIG. 3 is an exploded isometric view of the hose clamp cutter of the invention.

The tool of the present invention is used to effect a clean cut and removal of a shrink-wrap type hose clamp or hose band from a hose. Thus, in FIG. 1, there is depicted a typical radiator hose 14 associated with a radiator inlet or outlet nozzle 16 of a radiator assembly 18 of an automobile or truck, for example. The hose 14 is fitted over the nozzle 16 and retained thereon by a circular clamp or hose clamp 20 which is configured as a closed circular band having opposite side edges 22 and 24. The clamp 20, upon assembly of the hose 14 to the nozzle 16 as depicted in FIG. 2, is heated for an appropriate time and at an appropriate temperature so that it will reduce its diameter and, thus, tightly clamp the hose 14 to the nozzle 16. Thus, it is one object of the invention that an improved tool or cutter mechanism be provided for removal of the clamp 20. Although the following describes the improved tool and its utilization to cut clamps 20 used in association with a radiator hose, the tool of the invention and the method of the invention are not limited. Any band or ribbon of material may be cut or severed by the tool and method of the invention.

Reference is now made to the remaining FIGS. 2 through 7 for a description of the tool of the invention in greater detail and an explanation of its utility in removing and cutting the clamp 20. The tool includes a generally cylindrical tubular member or tube 26. Tube 26 includes a center throughbore or passage 28 which extends generally axially along axis 50 for the length of the tube 26. An elongate axial slot 30 is defined in the top of the tube or tubular member 26. The slot 30 extends from a first or internal end 32 to a distal or second end 34 of the tube 26. The slot 30 is, in the embodiment depicted, open at the distal or second end 34.

Projecting upwardly on opposite sides of the slot 30 at the distal end 34 are first and second tab members 36 and 38.

Each tab member 36 and 38 includes a hook or projecting top end 40 which projects toward the first end 32 of slot 30 thus defining a recess 42 which is designed to engage with and hold an edge, for example, edge 24 of the clamp 20, as will be appreciated by the description below.

The tube 26 includes a further slot 31 on the opposite diametrical side of the slot 30. Slot 31 has a first end 33 coterminous with the first end 32. The slot 31 also extends through the open end of the tube 26. Thus, the slots 30 and 31 are axially aligned with one another, are located on opposite sides of the tube 26, and have uniform or equal dimensions relative to each other.

In the embodiment shown, the throughbore or through passage 28 is specially shaped. It includes a counterbore section 44 at one end having a larger diameter than the main throughbore section 46. The main throughbore section 46 as well as the counterbore 44 are aligned uniformly along the centerline axis 50 when viewed in the top plan view as in FIG. 5 and are symmetrical or coaxial within the tubular member 26 during the original manufacturing procedure.

A land or flat 48 is milled or formed on the top surface of the tube 26. That land or flat 48 extends from the outer diametrical surface of the tube 26 beginning at the end over counterbore section 44 downwardly toward centerline axis 50. That is, the flat or land 48 is canted downwardly and cut into tube 26 during the manufacturing process to thereby effectively form the tabs 36 and 38. The utilization of the flat land 48 on the opposite sides of the slot 30 and extending downwardly toward the tabs 36 and 38 thus facilitates the manufacturing process of the tool. Additionally, the flat land 48 when positioned against the outside surface of a hose clamp 20 makes positioning of the cutter tool more easily accomplished and more effective than the circumstance, for example, when the cutter tube 26 is totally cylindrical. In other words, the land 48 facilitates positioning of the cutter tool during usage. It also enables use of a single cylindrical tubular member, machined on one surface, during the manufacturing of the tool.

Figures 5, 6, 7:
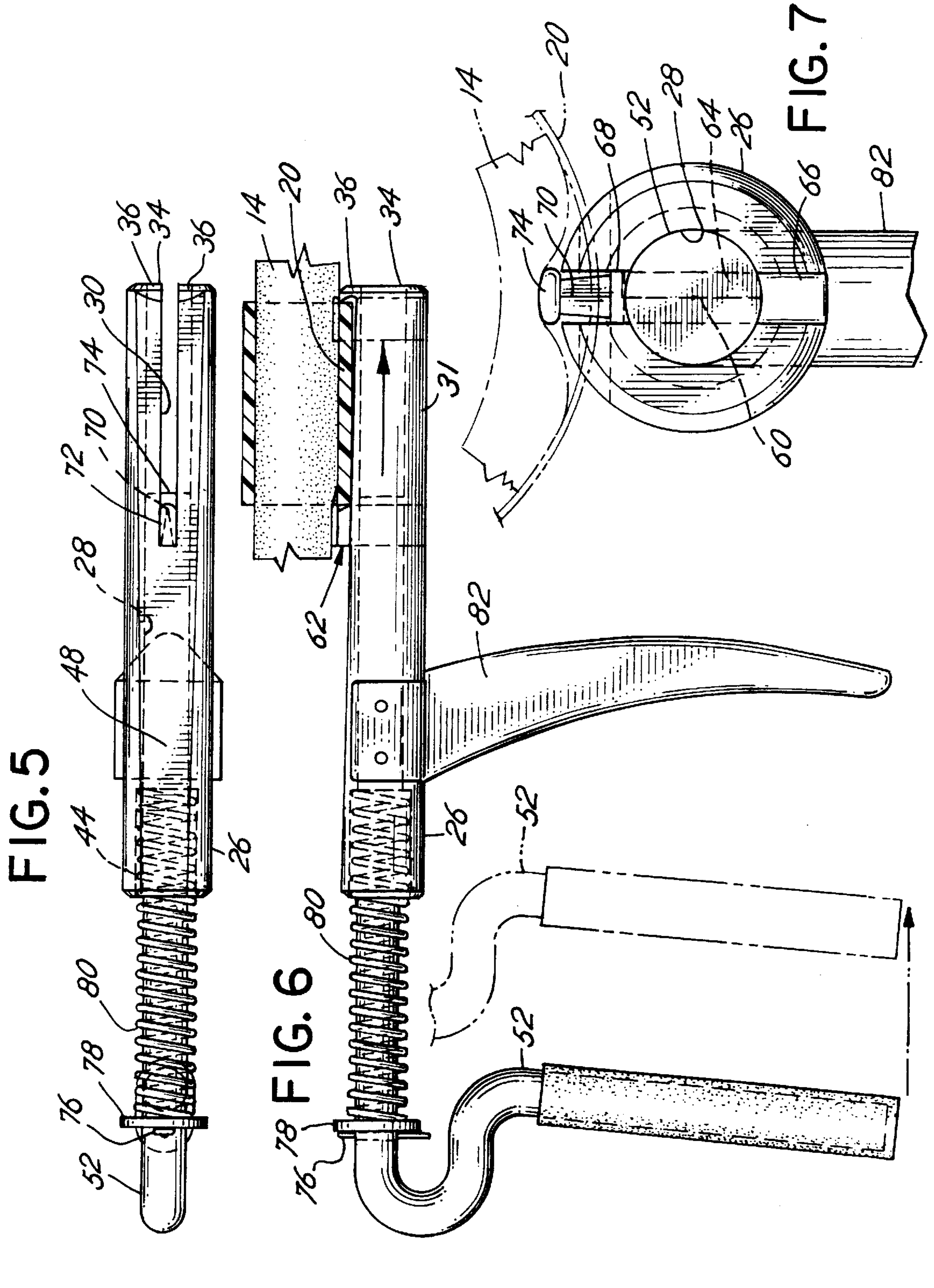
FIG. 5 is a top plan view of the tool of the invention.
FIG. 6 is a side elevation of the tool of FIG. 5.
FIG. 7 is an end elevation of the tool of FIGS. 5 and 6.

The throughbore 28 of the tubular member 26 is adapted to receive a shaft or rod 52. The shaft or rod 52, depicted in FIGS. 7 and 8, is a generally cylindrical shaft. It includes a bend 54 at one end and a downwardly extending handle 56 which optionally may include a grip such as an elastomeric or rubberized grip 58. A pin opening 75 in shaft 52 is transverse to axis 58 of the shaft 52. The shaft 52 is sized to easily or telescopically slide in the throughbore 28 of tube 26. The shaft 52 further includes a detent or transverse slot 60 at its distal end. The slot 60 is configured to receive a blade or cutter 62.

Blade or cutter 62 includes a longitudinal slot or detent 64 which enables the cutter 62 to fit over and into the recess or detent 60 in the rod 52. The cutter or blade 62 thus includes a radial lug 66 along its bottom edge and a further radial lug 68 on the opposite side of the slot 64. The lug 66, during use of the tool, is slidably retained within the slot 31 of the tube 26. The lug 68 is slidably retained within the slot 30 of the tube 26.

The blade 62 further includes a cutter element or sharpened edge 70 and a cap member or flange 72 which fits or projects over the edge 70 and is spaced from the lug 68. The flange 72 includes a forward projection or foot 74 which is inserted on the underside of a hose clamp 20 during initial cutting to effectively insure that the blade or cutting edge 70 will remain in contact with the hose clamp 20 during the entire cutting operation. This smooth edged cap 72 also keeps the cutter element 70 from engaging and cutting or otherwise damaging the soft hose under the band.

The tube 26 receives the rod 52. A cotter pin 76 fits in pin hole 75 and retains a washer 78 which engages a spring 80 and maintains the spring 80 in the counterbore 44. This spring 80 is thus positioned between the washer 78 and extends into the counterbore 44 to thereby engage the tube 26. A separate handle or grip 82 is riveted to the tube 26 by means of rivets 84 or spot welding 84. The cutter blade 62 is, of course, inserted by engagement of slot 64 of blade 62 with slot 60 of rod 52 so that the projection 74 extends toward the tabs 36 and 38. In this manner, a hose clamp 20 may be fitted under the projection 74 and into engagement with the cutter edge 70 with edge 22 or 24 of clamp 20.

Note that it is possible by appropriately dimensioning the construction to move the grip 58 toward the grip 82 when there is no hose clamp between the cutter blade 62 and tabs 36, 38, and in that circumstance to extend the rod 52 beyond the end 34 of the tube 26. Normally, however, the cotter pin 76 acts as a stop so that the cutter blade 62 cannot extend out the end of the tool during use. The pin 76 must therefore be removed before the handles 58, 82 can be squeezed together far enough to remove the cutter blade 62 from the end of the tool. Nonetheless, when the cotter pin 76 is removed and handles 58, 82 are squeezed together, the blade 62 may be removed by disengagement from the rod 52 and replaced. In normal situations, however, the pin 76 will limit travel of rod 52 and the biasing spring 80 will bias the rod 52 thereby maintaining the blade 62 in the slots 30, 31 precluding removal of the blade 62. Thus, during normal operation of the tool, the blade 62 is moved toward the tabs 36, 38 but need not extend beyond the distal end 34 of the tube 26 in order to effect a cut and removal of a hose clamp 20.

FIGS. 2 and 7 illustrate in greater detail the method of operation of the tool. As shown, the blade 62 and more particularly the projection 74 of the blade 62 is fitted underneath an edge 24 of clamp 20. Also tab 40 fits under the opposite edge 22 of clamp 20. The grip 58 as well as the grip 82 are then manually engaged and squeezed together. This causes the grip 58 and, more particularly, the rod 52 to transport the blade 62 toward the tabs 36 and 38. This effects a cutting operation by the tool.

Many cutable materials may be severed by the use of the described tool. Items other than hose clamps, for example, wrapping straps may be cut for removal from packages. The tool may also be made in various ways. For example, the cutter blade 62 may be attached by a fastener to rod 52.

Thus, while there has been set forth a preferred embodiment of the invention, however, it is to be understood that the invention is to be limited only by the following claims and there equivalents.

It is claimed:

1. A hose clamp cutter comprising, in combination:

(a) a straight tubular member having a longitudinal axis, said tubular member including an axial throughbore, an elongated axial slot through one side of the tubular member, said slot having a first stop end and a second end, said tubular member including a radially, outwardly projecting tab at the second end of the slot;

(b) a handle grip member extending radially, outwardly from the tubular member;

(c) a rod slidably and telescopically inserted into one end of the throughbore of the tubular member, said rod movable axially in the axial throughbore, said rod including a handle extension integral with the rod and extending radially, outwardly from the rod;

(d) a blade affixed to the rod and extending radially from the rod through the slot in the tubular member, said blade slidable axially in the slot between the first stop end toward the second end in response to manual gripping of the rod handle extension and telescopic movement of the rod in the tubular member as the rod handle extension moves toward the handle grip member of the tubular member, said blade thereby being manually transportable toward the projecting tab of the tubular member to effect a cut through material in a space between the blade and the tab, and (e) means for biasing the attached blade, rod handle extension and the rod simultaneously axially in a direction from the second end toward the first stop end of the slot.

2. The cutter of claim 1 wherein the means for biasing comprises a spring member positioned between the tubular member and the rod.

3. The cutter of claim 1 wherein the means for biasing comprises a coil spring on the rod, said spring including first and second ends and a through passage, said rod extending through the through passage, the first of said ends of the spring engaging the tubular member, and the second end of the spring engaging the rod, said spring being compressed therebetween.

4. The cutter of claim 1 wherein the blade includes a cutting edge opposed to the tab.

5. The cutter of claim 1 wherein the blade is removably attached to the rod.

6. The cutter of claim 1 wherein the blade includes a cutting edge opposed to the tab and a foot projection spaced from the tubular member and extending toward the tab at the second end of the tubular member.

7. The cutter of claim 6 wherein the foot projection has smooth edges.

* * * * *